US 6,653,782 B2

(12) United States Patent
Vallabhaneni et al.

(10) Patent No.: US 6,653,782 B2
(45) Date of Patent: Nov. 25, 2003

(54) FUSE AND SAFETY SWITCH FOR HALOGEN INCANDESCENT LAMPS

(75) Inventors: Eswara V. Vallabhaneni, Elmira, NY (US); Joseph P. Woods, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/029,833

(22) Filed: Dec. 27, 2001

(65) Prior Publication Data

US 2003/0122484 A1 Jul. 3, 2003

(51) Int. Cl.[7] .............................. H01K 1/50; H01K 1/18; H01J 17/18; H01J 61/36
(52) U.S. Cl. .................. 313/578; 313/623; 313/271
(58) Field of Search .................... 313/315, 578–580, 313/623, 271, 318.07; 315/119; 314/10

(56) References Cited

U.S. PATENT DOCUMENTS

| | | | | |
|---|---|---|---|---|
| 2,011,922 A | * | 8/1935 | Von Weldel | 313/598 |
| 2,177,705 A | * | 10/1939 | Friederich | 313/486 |
| 3,441,771 A | * | 4/1969 | Honeycutt | 313/113 |
| 3,505,556 A | * | 4/1970 | Belknap | 313/318.12 |
| 4,132,922 A | | 1/1979 | Newton et al. | 315/73 |
| 4,550,270 A | * | 10/1985 | Kimball et al. | 313/579 |
| 4,687,963 A | * | 8/1987 | Gagnon et al. | 313/17 |
| 4,752,718 A | * | 6/1988 | Strauss et al. | 315/73 |
| 5,670,840 A | * | 9/1997 | Lanese et al. | 313/25 |
| 6,060,820 A | * | 5/2000 | Noll et al. | 313/113 |
| 6,262,534 B1 | * | 7/2001 | Johnson et al. | 313/623 |

FOREIGN PATENT DOCUMENTS

| | | | |
|---|---|---|---|
| EP | 0160037 B1 | 11/1985 | H01K/1/32 |
| GB | 1165940 | 11/1967 | H01K/1/18 |
| GB | 2144264 | 2/1985 | H01K/1/34 |
| JP | 5380786 | 7/1917 | H01K/1/34 |

OTHER PUBLICATIONS

Patent Application: US 000135, filed: Jun. 29, 2000, Ser. No.: 09/606,396, Inventors: Joseph P. Woods et al. Entitled: Halogen Incandescent Capsule Having Filament Leg Clamped in a Press Seal.

* cited by examiner

Primary Examiner—Sandra O'Shea
Assistant Examiner—Peter Macchiarolo
(74) Attorney, Agent, or Firm—Ernestine C. Bartlett

(57) ABSTRACT

A lamp has a base and a light-transmitting soft-glass lamp envelope sealed to the base to form a sealed lamp cavity which is filled with a non-oxidizing gas. Current supply leads are connected to the stem feedthroughs and extend into the lamp cavity. A halogen incandescent burner is located in the lamp cavity and has a light-transmitting hard-glass burner envelope which encloses a sealed burner cavity filled with an inert gas containing halogen. The burner envelope has presses at its ends. A tungsten filament coil in the burner has extended legs at its ends that extend out of the burner cavity into the lamp cavity through the burner presses and are connected to the current supply leads in the lamp cavity to act as fuses which open upon breach of the lamp envelope, thus preventing further burner operations.

30 Claims, 5 Drawing Sheets

FUSE AND SAFETY SWITCH FOR HALOGEN INCANDESCENT LAMPS

BACKGROUND OF THE INVENTION

1. Field of the Invention

The invention relates to selection of material for a fuse/safety switch in a halogen incandescent lamp. The fuse includes a metallic conductor that operates with no degradation during normal operation of the lamp and will burn out, oxidize or fail to conduct during gas changes when the outer bulb is broken. The halogen incandescent lamp includes a burner having a filament with one or both ends that are extended outside the burner through its press seals. More particularly, the extended filament ends outside the burner act as fuses or safety switches when the burner is mounted in a sealed outer envelope. The fuse/safety switch construction renders the lamp inoperable upon breach of the outer envelope and eliminates the fire hazard associated with the operation of the exposed halogen burner.

2. Discussion of the Prior Art

Safety of lamps is paramount in lamp design to protect the user from lethal and potentially destructive sources that may be present when a lamp is partially fractured. In lamps consisting of a light emitting and self contained sealed inner tube, such as a halogen incandescent burner, where electrical conduction is through an outer bulb plus base assembly, the lamp may be partially broken and still operational.

Halogen incandescent lamps consisting of an inner "halogen burner" within a sealed outer have been introduced and are more efficient than conventional incandescent lamps.

FIG. 1 shows a known halogen incandescent burner or capsule having a tungsten filament 10 with a barrel 16 between a pair of tungsten legs 18, and a "double ended" quartz envelope 20, with a pinch seal or press 22 at each end. The barrel 16 is located in a central or burner cavity 24, and the coil ends or legs 18 extend into the presses 22 and are each welded to one end of a molybdenum foil 26. Molybdenum current supply leads 28 are welded to the other end of the respective molybdenum foils 26 and extend out of the presses 22.

To facilitate welding of the tungsten coiled legs 18 to the molybdenum foils 26, a small metal foil (platinum) 26A may be placed between the tungsten coil legs 18 and the molybdenum foil 26. The press 22 contains the molybdenum foil 26, the platinum foil 26A, as well as the ends of the respective tungsten coil legs 18 and the molybdenum current supply leads 28. The molybdenum foils 26 are required in the quartz envelope 20 to create a gas-tight seal in the presses 22 over the operating temperatures of the burner 5. Other burners use mechanical clamps instead of molybdenum foils to electrically attach the tungsten coil legs to the molybdenum current supply leads, where the clamps are located in the press seals and/or the central/burner cavity as described in U.S. patent application Ser. No. 09/606,396, which is incorporated herein by reference.

FIG. 2 shows the filament 10 used in the halogen burner shown in FIG. 1. The coiled-coil filament 10 has a primary coil 14 and a secondary coil 16. The filament 10 is formed with a tungsten wire 12 wound on a primary mandrel having a diameter on the order of 80–150 $\mu$m to form the primary coil 14 having an external diameter on the order of 100–300 $\mu$m. The primary coil 14 is wound on a secondary mandrel having a diameter on the order of 300–800 $\mu$m to form the secondary coil 16 which forms the barrel 16. The secondary mandrel is retracted or dissolved, and the primary mandrel is then removed in whole or in part by dissolving. U.S. Pat. No. 4,132,922 discloses a double-ended burner having a U-shaped fuse and a so-called retained mandrel coil. Portion of the U-shaped fuse is embedded in the press seals while another portion is in the burner.

Double-ended quartz burners are marketed in thin-glass outers, such as blown glass reflectors, decorative outers and the like for general lighting applications. Double-ended quartz burners or capsules 5 with coil legs 18 extending into the presses 22, as shown in FIG. 1, have passive extinction of electric arc at end-of-life.

There is a need to eliminate non-passive failures in hard-glass halogen burners to enable marketing of thin-glass outer lamps containing the hard-glass burner. Further, there is a need to reduce the cost of lamps and to increase efficiency of manufacture thereof. There is also a need to eliminate molybdenum foils or clamps in the burner as well as eliminating the need for additional elements to form a safety switch or fuse in order to reduce lamp cost, simplify manufacture thereof, and provide a more robust lamp, while preventing lamp operation when the outer lamp envelope is breached.

Further, in a lamp having a self-contained, light emission source mounted in and electrically connected through a sealed outer, there is a need for a safety switch or fuse that will disable operation of the inner arc tube when the hermetically sealed outer is broken. There is also a need to disable power to inner arc tube at the time the hermetic seal is fractured and power applied to the lamp. A further need is to disable electrical conduction of high-voltage differences within the inner volume conductive surfaces prior to application of high current. There is also a need to achieve these safety improvements in lamps with vacuum or subatmospheric pressure, such as anaerobic gas for example between the inner and the outer. There is a further need to reduce the cost of double ended burners, such as made from quartz. There is also a need for reduction of stress within the press seal and metal conductor interface.

There is a further need for improvement of manufacturing efficiency, and dealing better with exhaust tubes, such as selling the exhaust tube with the lamp. There is a need for a protective layer over the fusing material to prevent ignition of nearby material in a "cheese cloth" test. There is also a need for an arc tube design with a dominant passive failure mechanism at the end-of-life.

SUMMARY OF THE INVENTION

According to the invention, a halogen incandescent capsule or burner, which may be double-ended or single-ended, has an envelope, such as a hard-glass or quartz envelope, forming an inner/burner cavity. Illustratively, the burner is surrounded by an external envelope attached to a base to form a lamp. At least one end of the burner has a press. A filament, e.g. a tungsten filament, is included in the inner cavity. At least one leg of the filament is modified, e.g., stretched, extended, uncoiled for a coiled filament or never wound, to extend out of the press for electrical attachment, by welding for example, to lamp current supply leads in an outer/lamp cavity between the burner and the external envelope of the lamp. For a double-ended burner, one or both legs of the filament may be modified to extend out of one or both of the presses, while for a single-ended burner, one of the legs of the filament is modified to extend out of the press. The lamp cavity is evacuated and filled with a non-oxidizing gas at less than one atmosphere of pressure.

The tungsten wires that extend out of the burner and are connected to the current supply leads in the outer cavity act as fuses or safety switches, thus eliminating the need for additional elements to form a fuse or to form lead wires and foils in the presses.

When the filament fails at end-of-life, the arc is extinguished passively with disintegration of the filament leg in the inner cavity and/or near the inside surface of the presses.

According to a further aspect of the invention, the filament has a primary coil, where the primary coil of the filament leg is modified so that the leg portion in the press is straight or has an increased pitch. The extended coil leg reduces the extinction time and electric arc energy at the end-of-life due to reduced linear wire density near the pinch. Further, the portion of the stretched-out tungsten leg outside the burner, i.e., in the outer/lamp cavity acts as a fuse or safety switch. In particular, upon breach of the outer or external lamp envelope and with power applied to the lamp, this extended leg portion disintegrates thus acting as an open fuse or switch and preventing continued operation of the burner upon breach of the outer. This eliminates an otherwise fire hazard due to the high temperature of the operating burner.

Modifying, e.g., stretching out, the coil leg enables a robust to attachment of the tungsten wire, e.g., by welding, to the lead wire of the lamp. This provides an economical manufacture of the lamp having a fuse or safety switch, by simple manufacture of the burner having extended tungsten leads for attachment to the lamp current supply lead wires. Thus, clamping the lamp lead wires on the primary winding is eliminated which requires a tight tolerance gap within the molybdenum clamp, which in turn, eliminates strain in the clamped leg and fractures of the coil leg. Attachment of the modified coil leg to the lamp lead negates the requirement of changeover time between wattages at the mount machine.

It is to be understood that both the foregoing general description and the following detailed description are exemplary and explanatory and are intended to provide further explanation of the invention as claimed.

BRIEF DESCRIPTION OF THE DRAWINGS

Further features and advantages of the invention will become more readily apparent from a consideration of the following detailed description set forth with reference to the accompanying drawings, which specify and show preferred embodiments of the invention, wherein like elements are designated by identical references throughout the drawings; and in which.

Figure 1:
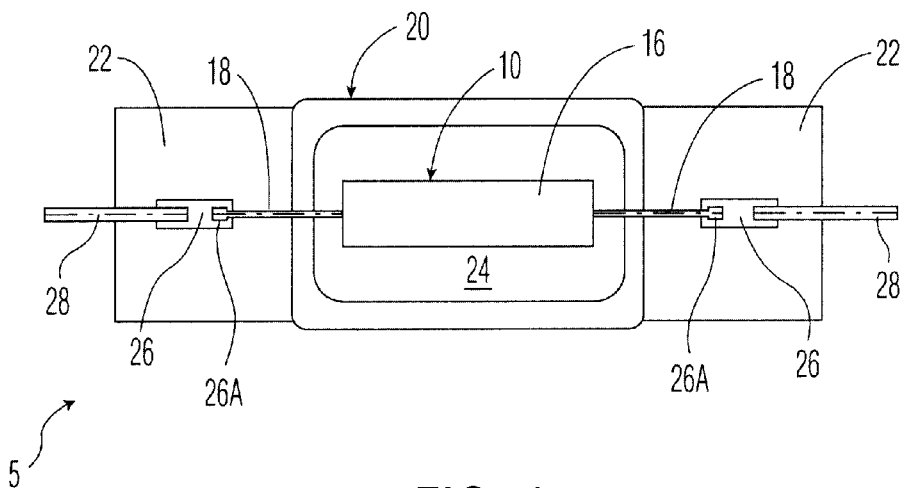
FIG. 1 shows a conventional double-ended quartz burner with foils in the press.

The invention, together with attendant advantages, will be best understood by reference to the following detailed description of the preferred embodiment of the invention, taken in conjunction with the accompanying drawings.

DESCRIPTION OF THE PREFERRED EMBODIMENTS

Before explaining the present embodiments in detail, it should be understood that the invention is not limited in its application or use to the details of construction and arrangement of parts illustrated in the accompanying drawings and description. It will be recognized that the illustrative embodiments in accordance with the invention may be implemented or incorporated in other embodiments, variations and modifications, and may be practiced or carried out in various ways. Furthermore, unless otherwise indicated, the terms and expressions employed herein have been chosen for the purpose of describing the illustrative embodiments of the present invention for the convenience of the reader and are not for the purpose of limitation.

End-of-life failure mechanisms can be separated into passive and non-passive. Changing the arc tube geometry to induce a passive failure end-of-life mechanism in the lamp will improve the safety of the product. The safety of the inventive lamp is assured since the passive failure mechanism dominates other failure mechanisms such as to the parts per million range, for example.

The inventive lamp may include a sealed outer bulb that contains an internal light emitting tube that must be disabled if the integrity of the outer bulb is broken. A safety switch or fuse construction is required for safe operation of the lamp that will burn out when the outer envelope fails. Safety factors regarding the danger sources may include but are not limited to high temperature operation of the inner tube which presents a fire to hazard, high levels of electromagnetic emission of the inner tube that is blocked by the outer bulb, and high-voltage differences that must be interrupted when the outer bulb is broken.

A concept of the safety switch is a fuse construction with a metallic conductor that will not oxidize, degrade or disintegrate in the sealed non-oxidizing outer bulb gases during normal operation of the lamp. The conductor operates at sufficient temperature to oxidize and disintegrate with power applied to the lamp and breach of the outer bulb.

In the specific application of the incandescent Halogena' type products having a halogen burner contained within a sealed outer bulb, the fusing material can be composed of the same diameter tungsten wire that is used within the halogen burner. In the application of a hard-glass halogen burner in a thin walled sealed outer, one leg of the coil can be extended through the hard-glass press thereby creating the safety switch external to the burner and creating a fused construction within the halogen burner for passive end-of-life failure mechanism in the hard-glass burner.

This concept may also be applied by constructing a non-hermitically sealed fuse containing tungsten wire as the current element and welding this fuse assembly in the circuit of the lamp between the outer bulb and the inner tube.

Figure 3:
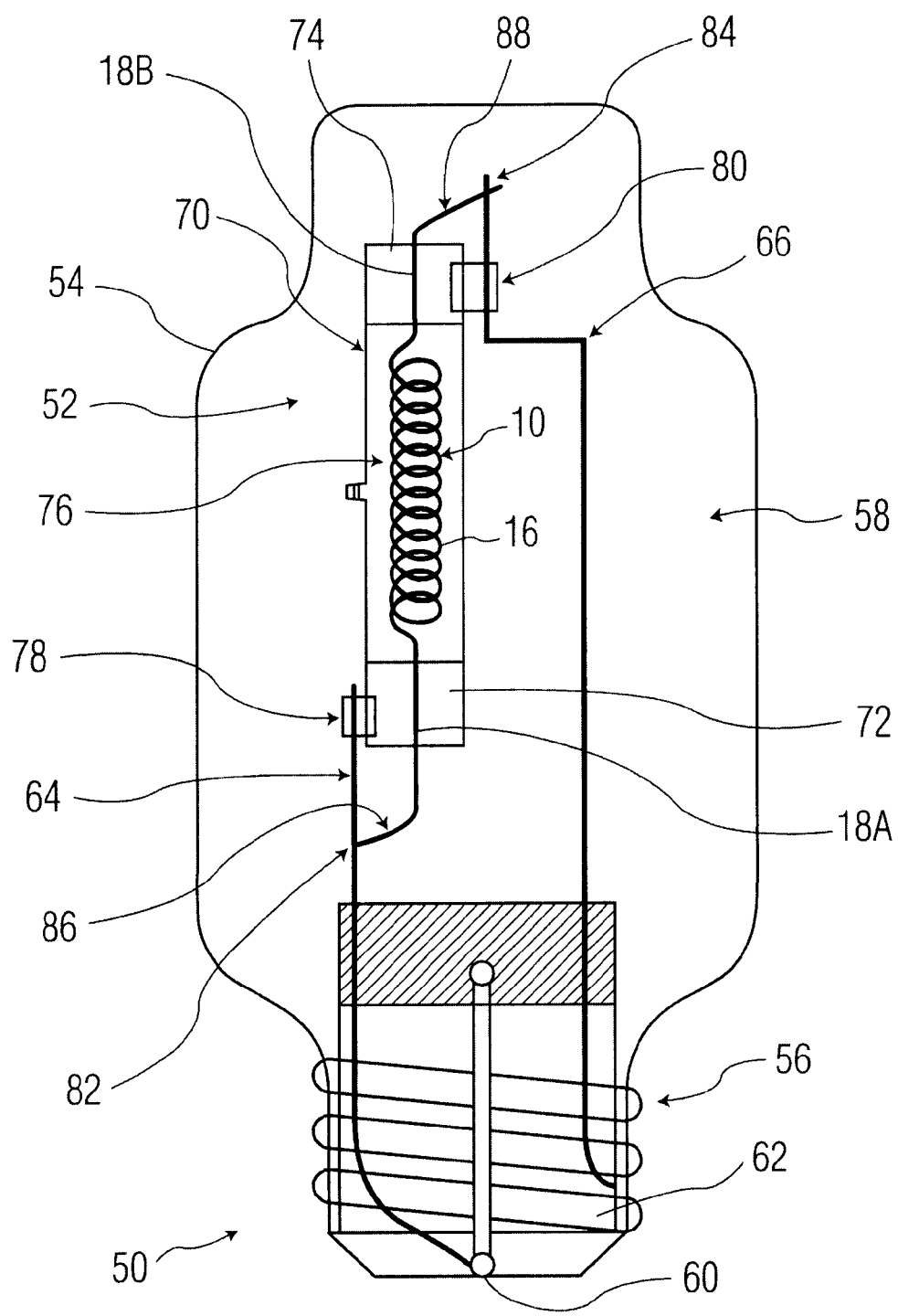
FIG. 3 shows a lamp having a double-ended burner with extended tungsten filament ends that extend out of the presses according to the present invention.

FIG. 3 shows lamp 50 having a double-ended halogen incandescent a burner 52, and an outer envelope 54, referred to as a lamp envelope, which is hermetically sealed to a conductive base or stem 56 to form a sealed outer or lamp cavity 58. The outer envelope 54 may be thick or thin walled, the fuse/safety switch construction will operate with any sealed outer envelope. The base 56 includes a center contact 60 and an outer contact 62 having spiral threads for screwing into a lamp socket for example. Current supply lead wires 64, 66 are connected, e.g., welded, at one end to center and outer contacts 60, 62, respectively. The current supply lead wires 64, 66 may be any type of conductor or low cost metallic supports that have good electrical conductivity and sufficient mechanical strength at the lamp operating temperatures. Illustratively, the current supply lead wires 64, 66 are nickel coated iron based conductors and are connected to electrical feedthroughs through the stem 56 which may be dumet, copper clad wire or tungsten, for example.

The double-ended burner 52 has an envelope 70 with a pair of opposed presses 72, 74 and a hermetically sealed cavity 76, referred to as a burner cavity containing the secondary coil or barrel 16 of the tungsten filament 10. Illustratively, the envelope 70 is light-transmitting with a coefficient of thermal expansion which matches that of tungsten, such as hard-glass. The coefficient of thermal expansion of the hard-glass matches that of tungsten thus eliminating the requirement of the molybdenum foils 26 in quartz envelopes shown in FIG. 1. The burner cavity 76 is filled with an inert gas containing halogen. The burner 52 is supported by the current supply lead wires 64, 66, where clamps 78, 80 attach the respective lead wires 64, 66 to the respective presses 72, 74 of the burner 52.

Figure 2:
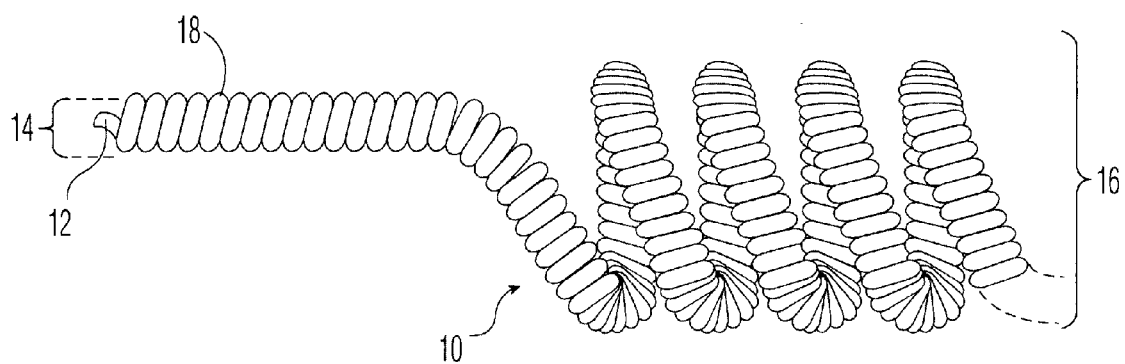
FIG. 2 shows a conventional coiled-coil filament.

According to a preferred embodiment, and as will be described in greater detail in conjunction with FIG. 4, the primary coil 14 of the filament 10 is modified, e.g., uncoiled and stretched out, so that the diameter of the legs 18A, 18B is reduced to nearly the diameter of the tungsten wire 12 in the press seals 72, 74. The filament 10 may be made where its legs already stretched and extended, e.g., where the legs are not wound into the primary coil 14 shown in FIG. 2. It should be noted that the filament 10 need not be wound or coiled to form the primary coil 14 (FIG. 2), and thus tungsten wire is wound to only form the secondary coil 16', as shown in FIG. 5.

Returning to FIG. 3, the extended filament legs 18A, 18B extend out of the burner cavity 76 through the respective presses 72, 74 and into the lamp cavity 58, where they are attached, e.g., welded, to respective lead wires 64, 66 at locations 82, 84. The lamp cavity 58 is evacuated and filled with a non-oxidizing gas, such as argon or nitrogen for example, to protect and prevent oxidation of portions 86, 88 of the extended legs 18A, 18B located in the lamp cavity 58 extending out of the presses 72, 74 and welded to the lead wires 64, 66.

The tungsten wire leg portions 86, 88 act as fuses or safety switches. In particular, if the outer or lamp envelope 54 is breached, the tungsten wire leg portions 86, 88 oxidize and break electrical contact thus rendering the burner inoperative. This prevents burner operation when the outer is breached. Otherwise, the halogen burners would continue to operate, which typically operate with a wall temperature that is capable of igniting material (cheese cloth testing), and thus pose a fire hazard.

Advantageously, no additional elements are required for the fuses/safety switches of the inventive lamp. Further, molybdenum lead wires, molybdenum foils and clamps in the presses 72, 74 or the burner cavity 76 are eliminated, thus simplifying manufacture of the burner 52. Molybdenum is no longer necessary for burner construction. The burner simply contains tungsten coil with extended legs extending out of the presses.

Further, this construction assures passive extinction of end-of-life arcing when at least one of the extended legs 18A, 18B disintegrates in the burner cavity and near the inside surface of the presses 72, 74. As discussed in conjunction with FIG. 4, the primary coil 16 is modified such that the leg diameter is reduced to nearly the diameter of the tungsten wire 12.

Both legs of the filament 10 need not be modified and only a single leg may be stretched and extended out of one press to form a single fuse in the lamp cavity 58. The other leg may be connected to the current supply lead in a conventional manner, such as connected in the press using molybdenum foil 26 shown in FIG. 1, or through clamps as disclosed in the U.S. patent application Ser. No. 09/606,396, where the current supply lead may be molybdenum.

Figure 4:
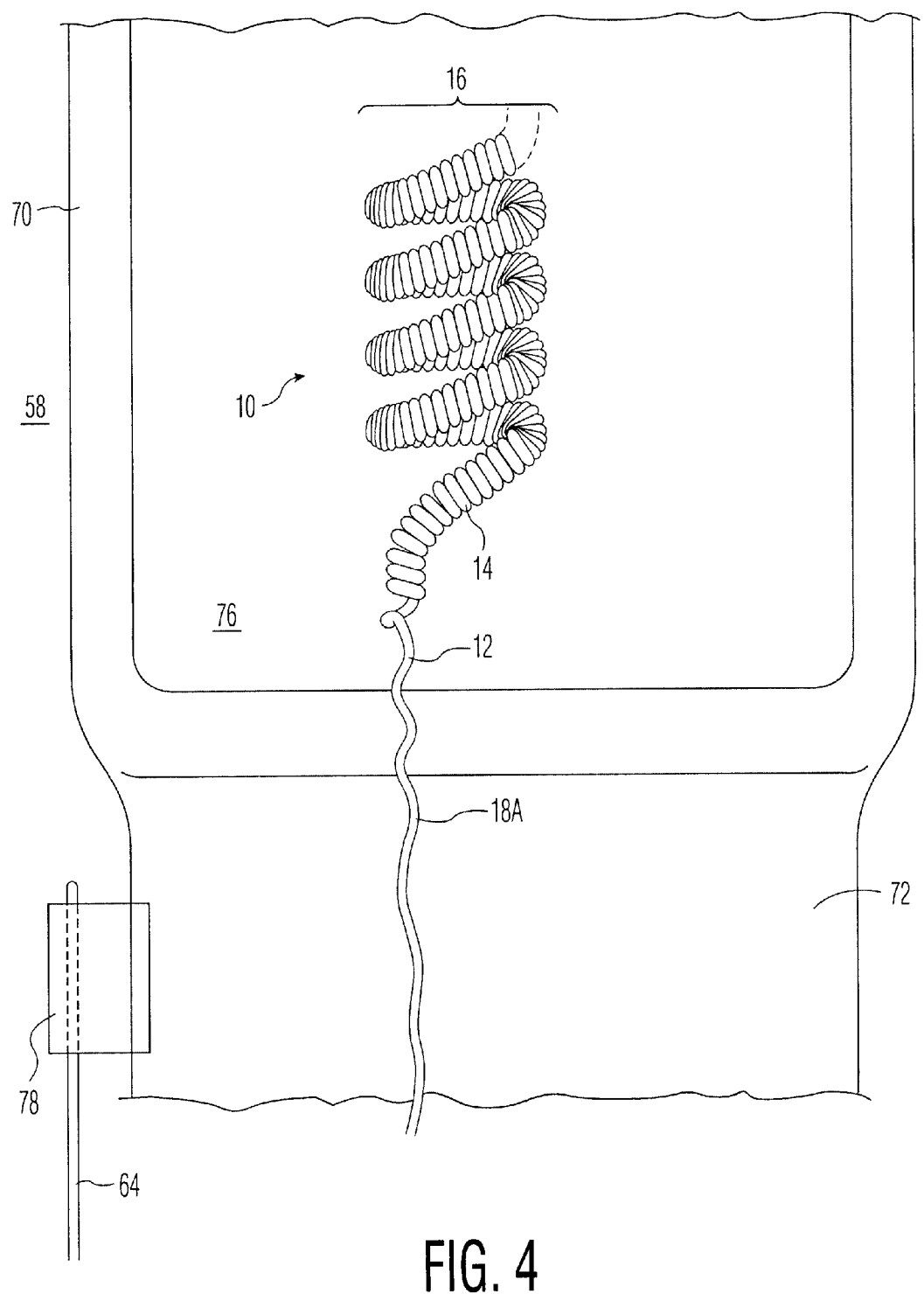
FIG. 4 shows in greater detail a coiled-coil filament with a modified coil leg extending out of the press of a double-ended burner according to the present invention.
Figure 5:
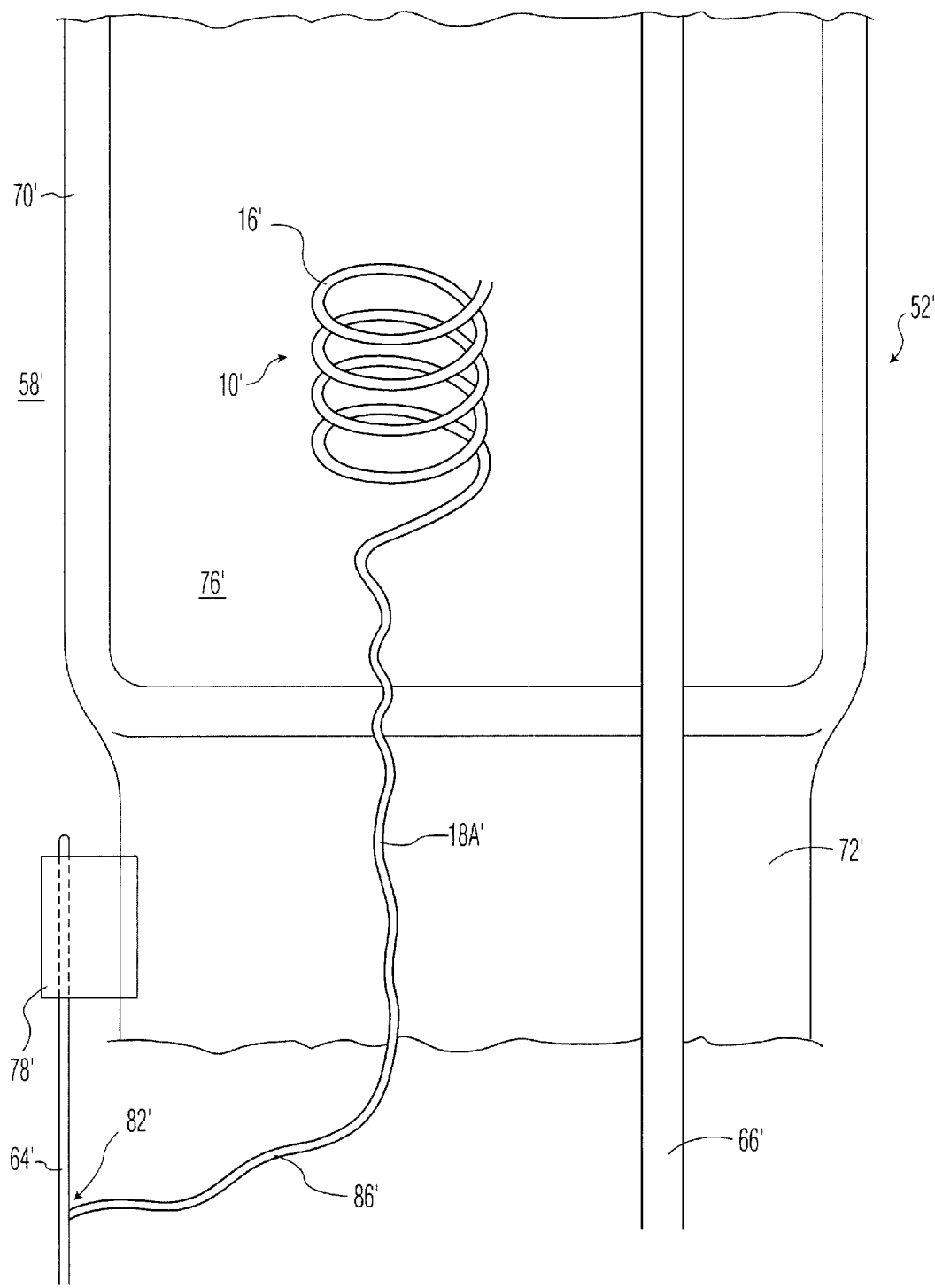
FIG. 5 shows in greater detail a filament with an uncoiled coil leg extending out of the press of a single-ended burner according to the present invention.

For clarity, FIG. 4 shows only one of the modified legs 18A, 18B of the tungsten filament 10. However, it is understood that both modified tungsten legs 18A, 18B may have similar form. Similar to FIG. 2, the tungsten filament 10 has a primary coil 14 and a secondary coil 16, but in FIG. 4 the primary coil 14 is modified, e.g., extended, to assume nearly the diameter of the tungsten wire 12, to form the tungsten lead wire or leg 18A (as well as leg 18B shown in FIG. 3). Using the same diameter tungsten wire 12 for the legs 18A, 18B (non-coiled condition) as in the coil 14 will operate at a temperature sufficient to cause rapid oxidation when exposed to air upon breach of the outer lamp envelope 54 (FIG. 3). The extended leg 18A extends out of the burner cavity 76 into the lamp cavity 58 through the burner press seal 72. The tungsten wire 12 of the legs 18A, 18B external to the burner 52 and in the lamp cavity 58 may be enclosed in a housing which is exposed to the ambient environment of the lamp cavity 58 to prevent ignition of cheese cloth during rapid oxidation upon breach of the lamp envelope 54.

The modified primary coil 14 in the legs 18A, 18B, simplifies burner and lamp manufacture by obviating either the need for molybdenum foils or the need for close tolerances in the clamps used in conventional burners. Further, the extended filament legs 18A, 183 hasten the extinction of the end-of-life arc by virtue of reduced linear wire density at the press seals 72, 74.

FIG. 5 shows the filament 10' which is not wound or coiled and thus does not has the primary coil 14 (FIG. 4). Rather, the filament 10' only has the secondary coil 16'. It is understood that such a filament 10' can be used instead of the coiled-coil filament 10 in any burner, whether double-ended or single-ended. Further, it is understood that for a double-ended burner with two presses, one or both filament legs may be extended out of the burner cavity to form one or two fuses. It is also understood that a single-ended burner with one press may be used instead of the double-ended burner. In this case, one of the filament legs is extended out of the burner cavity to form one fuse.

FIG. 5 shows a single-ended burner 52' with one press 72' through which one leg 18A' extends out of the burner cavity 76' into the lamp cavity 58' to form a fuse 86'. As described in connection with FIG. 3, the extended leg 18A is electrically attached, e.g., welded, at locations 82' to one of the current supply leads 64', which is mechanically attached, e.g., clamped, to the press 72' by a clamp 78'. FIG. 5 also shows the second current supply leads 66' which enters the burner cavity 76' through the press 72' for attachment to the other leg of the filament 10', as shown in FIG. 6.

Figure 6:
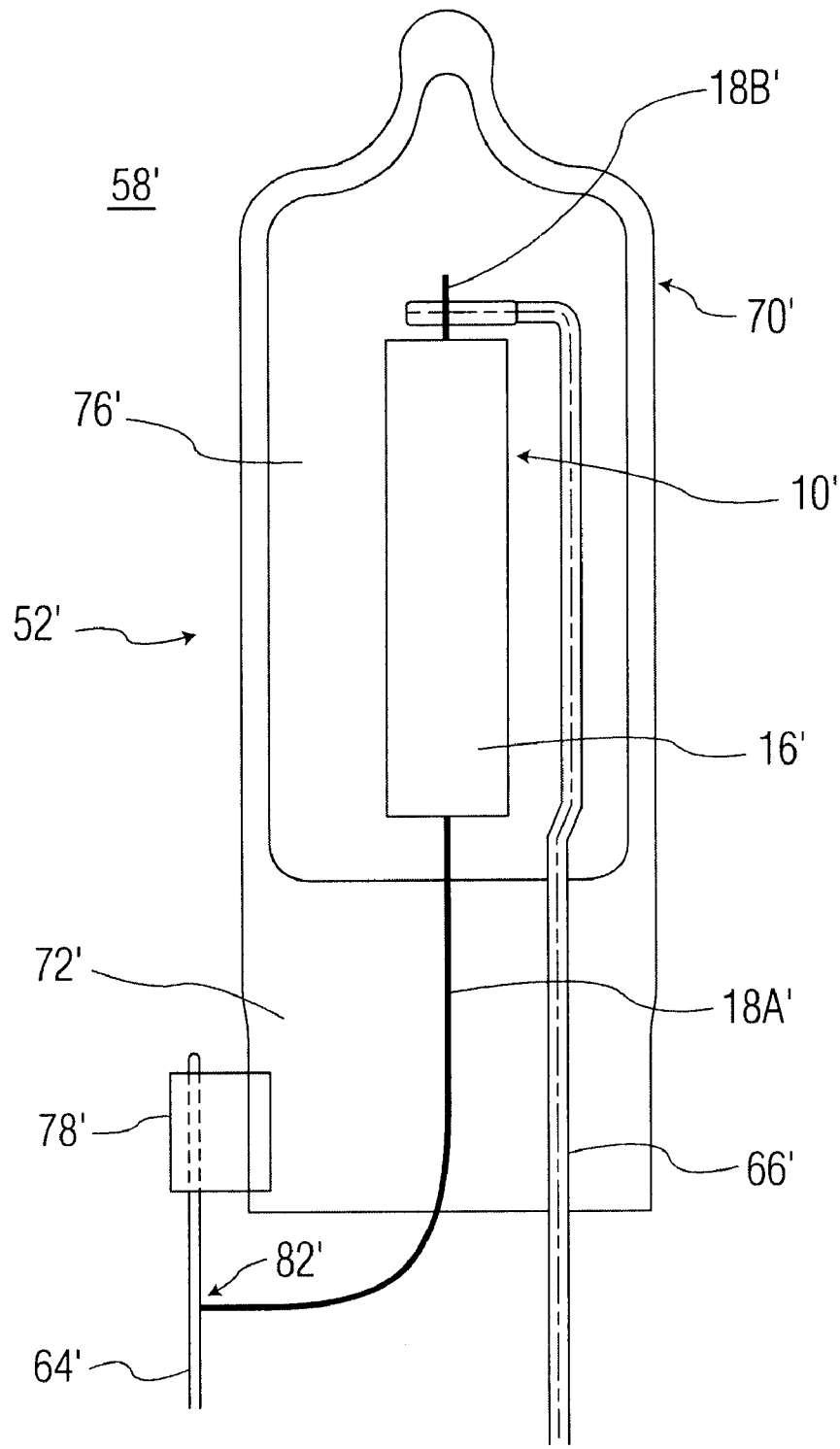
FIG. 6 shows a single-ended burner with an extended tungsten filament end that extends out of the press according to the present invention.

FIG. 6 shows a single-ended burner 52' having an envelope 70' and a single press 72'. The tungsten filament 10' having a barrel 16' is located in the sealed burner cavity 76'. One leg 18A' of the filament 10' extends out of the burner cavity 76' through the press 72' into the lamp cavity 58' and is electrically connected, e.g., welded, to one of the current supply leads 64' at location 82' to form the fuse 86'. This short current supply lead 64' is mechanically attached to the press 72' by a clamp 78' for example. The second current supply lead 64' extends into the burner cavity 76' through the press seal 72'. This long current supply lead 64' is attached, e.g., clamped, to the second leg 18B' of the tungsten filament 10' and provides support as well as electrical connection to the second leg 18B' of the filament 10'. Illustratively, at least the long current supply leads 66' is molybdenum, and the short current supply leads 64' may also be molybdenum or any conductive material, such as nickel coated iron based conductors. The single ended-burner 52' may be included in a lamp similar to the lamp 50 shown in FIG. 3.

While the present invention has been described in particular detail, it should also be appreciated that numerous modifications are possible within the intended spirit and scope of the invention and the foregoing exemplary embodiments are and not intended to limit the scope of the claims which follow. For example, a single-ended or a double-ended burner may be used in a lamp with a coiled-coil filament with primary and secondary coils, or a filament with only a secondary coil, with one or both legs are stretched or never wound, to extend out of the burner cavity and form at least one fuse.

In interpreting the appended claims it should be understood that:
   a) the word "comprising" does not exclude the presence of other elements than those listed in a claim;
   b) the word "consisting" excludes the presence of other elements than those listed in a claim;
   c) the word "a" or "an" preceding an element does not exclude the presence of a plurality of such elements; and
   d) any reference signs in the claims do not limit their scope.

What is claimed is:

1. A halogen incandescent burner comprising:
   an envelope which encloses a burner cavity, the envelope having an end comprising a press;
   an inert gas containing halogen in the burner cavity; and
   a filament comprising a single continuous wire having leg portions and a barrel portion between the leg portions, the barrel portion being arranged in the burner cavity;
   wherein at least one of the leg portions extends out of the burner cavity through the press and extends out of the envelope beyond the press.

2. The halogen incandescent burner of claim 1, wherein said at least one leg is connected in an outer cavity, in which the burner is disposed, to a current supply wire which extends into the outer cavity, and wherein the outer cavity is enclosed by an outer wall.

3. The halogen incandescent burner of claim 2, wherein the outer cavity is filled with a non-oxidizing gas.

4. The halogen incandescent burner of claim 2, wherein the current supply wire mechanically supports the envelope within the outer cavity.

5. The halogen incandescent burner of claim 4, wherein the current supply wire is clamped to the press.

6. The halogen incandescent burner of claim 2, wherein the outer wall comprises a light-transmitting glass.

7. The halogen incandescent burner of claim 1, wherein a portion of the at least one leg which extends out of the pinch, is connected in an outer cavity to a current supply wire and is an oxidizable safety fuse, and wherein the outer cavity is hermetically sealed by an outer wall.

8. The halogen incandescent burner of claim 1, wherein the envelope comprises one of a light-transmitting hard-glass and a light-transmitting quartz.

9. The halogen incandescent burner of claim 1, wherein the filament comprises a single, continuous piece of tungsten wire.

10. The halogen incandescent burner of claim 1, wherein the envelope has a pair of opposed ends with a press at each end, each of said legs extending uninterruptedly through and out of a respective press.

11. The halogen incandescent burner of claim 1, wherein the barrel portion of the filament is a tungsten wire having a primary coil.

12. The halogen incandescent burner of claim 11, wherein the at least one leg portion in the press is extended to have essentially the diameter of the tungsten wire throughout the press.

13. A halogen incandescent burner comprising:
   a burner having an envelope which encloses a sealed burner cavity, the burner envelope having a first end comprising a first press and a second end comprising a second press;
   an inert gas containing halogen in the burner cavity; and
   a filament comprising a single continuous wire having a first leg, a second leg and a barrel portion between the first leg and the second leg, the barrel portion being arranged in the burner cavity;
   wherein the first leg and the second leg extend out of the burner cavity and uninterruptedly through the first press and the second press respectively.

14. The halogen incandescent burner of claim 13, wherein the first leg and the second leg are connected in an outer cavity in which the envelope is disposed, to a first current supply wire and a second current supply wire respectively, the outer cavity being enclosed by an outer wall.

15. The halogen incandescent burner of claim 14, wherein the outer cavity is filled with a non-oxidizing gas.

16. The halogen incandescent burner of claim 14, wherein the first current supply wire and the second current supply wire are directly connected to the envelope to mechanically support the burner within the outer cavity.

17. The halogen incandescent burner of claim 14, wherein the first current supply wire and the second current supply wire are clamped to the first press and the second press respectively.

18. The halogen incandescent burner of claim 13, wherein the filament is a tungsten wire having a primary coil and a secondary coil extending through the barrel portion between the first leg and the second leg.

19. The halogen incandescent burner of claim 18, wherein the first leg and the second leg in the first press and the second press are essentially straight and have essentially the diameter of the tungsten wire throughout the first press and the second press respectively.

20. A lamp comprising:
   a base;
   a lamp envelope sealed to said base to comprise a sealed lamp cavity;
   a non-oxidizing gas in the lamp cavity;
   a first current supply lead and a second current supply lead which are connected to the base and extend into the lamp cavity;
   a halogen incandescent burner located in the lamp cavity, said burner having a burner envelope which encloses a sealed burner cavity, the burner envelope having a first end comprised by a first press and a second end comprised by a second press;
   an inert gas containing halogen in said burner cavity; and a filament having a unitary first leg, a second leg and a barrel portion between the first leg and the second leg, the barrel portion being arranged in the burner cavity;

wherein the first leg and the second leg extend out of the burner cavity and continuously and uninterruptedly through the first press and the second press, respectively, and are connected externally of the first press and the second press to the first current supply lead and the second current supply lead, respectively, in the lamp cavity.

21. A lamp comprising:

a base;

a lamp envelope sealed to said base to comprise a sealed lamp cavity;

a non-oxidizing gas in the lamp cavity;

a first current supply lead and a second current supply lead which are connected to said base and extend into the lamp cavity;

a halogen incandescent burner located in the lamp cavity, said burner having a burner envelope which encloses a sealed burner cavity, the burner envelope having an end comprised by a press;

an inert gas containing halogen in the burner cavity; and a filament having a unitary first leg, a second leg and a barrel portion between the first leg and the second leg, the barrel portion being arranged in the burner cavity;

wherein the first leg extends out of the burner cavity into the lamp cavity by passing continuously and uninterruptedly through the press, and is connected externally of the press to the first current supply lead in the lamp cavity.

22. The lamp of claim 21, wherein the second current supply lead extends into said burner through the press and is attached to the second leg.

23. A halogen incandescent burner comprising:

an envelope which encloses a burner cavity, said envelope having an end which is comprised by a press;

an inert gas containing halogen in the burner cavity; and a filament having an uncoiled first leg, a coiled second leg, and a coiled barrel portion between the first leg and the coiled second leg, the barrel portion being arranged in the burner cavity;

wherein the first leg extends continuously and uninterruptedly through the press.

24. The halogen incandescent burner of claim 23, wherein a current supply lead, which is thicker than the filament, extends into said burner through the press and is attached to the coiled second leg.

25. The halogen incandescent burner of claim 23, wherein the coiled second leg has an uncoiled portion, and wherein a current supply lead extends into said burner through the press and is attached to the uncoiled portion.

26. The halogen incandescent burner of claim 13, wherein the filament is a single continuous piece of wire.

27. A halogen incandescent burner arrangement comprising:

an outer wall which defines a main cavity;

an envelope which is disposed in the main cavity and which encloses a burner cavity, the envelope having an end comprising a press;

a current supply wire which extends into the main cavity and which is clamped directly to a portion of the envelope in a manner which mechanically supports the envelope in the main cavity; and a filament having leg portions and a barrel portion between the leg portions, the barrel portion being disposed in the burner cavity;

wherein at least one of the leg portions extends out of the burner cavity through the press and has a portion connected to the current supply wire externally of the press, and which portion acts as a fuse in the event that the outer wall is beached and the wire portion is exposed to an oxidizing gas.

28. A halogen incandescent burner arrangement of claim 27, wherein the at least one of the leg portions extends continuously and uninterruptedly through the press.

29. A halogen incandescent burner arrangement of claim 27, wherein the barrel and leg portions are comprised of a single unitary piece of wire.

30. A halogen incandescent burner arrangement of claim 27, wherein the barrel portion includes at least a primary coil.

* * * * *